Oct. 4, 1927.
L. W. BUGBEE, JR
1,643,978
LENS BLOCK
Filed Dec. 8, 1925
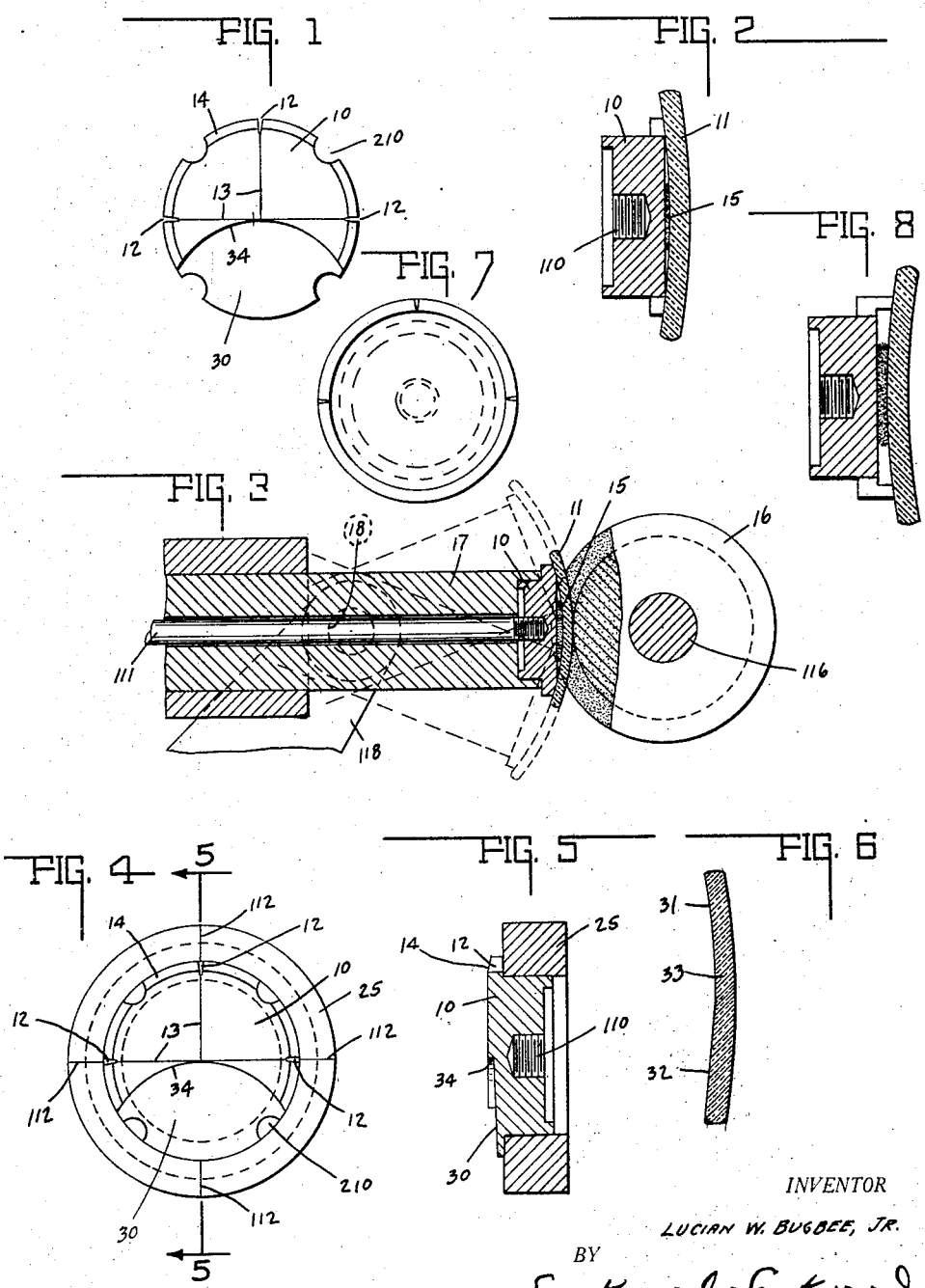
INVENTOR
LUCIAN W. BUGBEE, JR.
BY
Lockwood Lockwood
ATTORNEYS.

Patented Oct. 4, 1927.

1,643,978

UNITED STATES PATENT OFFICE.

LUCIAN W. BUGBEE, JR., OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

LENS BLOCK.

Application filed December 8, 1925. Serial No. 74,205.

The object of this invention is an improved lens block for use in making ophthalmic lenses, and particularly toric lenses and bifocal lenses, and particularly in the process set forth in the application of Lucian W. Bugbee, Serial No. 655,367, filed July 23, 1923.

One feature of the invention consists in making a circular lens block with a beveled annular seat for the lens blank located at the edge of the block and having a different curvature from the major and central portion of the block, but having a curvature approximating the curvature of the lens blank so that the lens blank can be secured and seated on said beveled surface in direct contact with the lens block and there will be a slight space between the middle portion of the lens block and the blank, whereby the two may be secured together by cement. This sort of lens block, therefore, lends itself to absolutely accurate mounting of lenses and blanks.

Another feature of the lens block is that it is provided with notches in the periphery thereof for indicating the principal meridians, and meridional lines on the face of the block which at their intersection mark the optical center of the lens mounted thereon, so as to facilitate the accurate blocking of the lens which has previously also had its principal meridians and optical center indicated by a protractor or other suitable means. This enables the lens to be accurately mounted on said block for use not only in generating the surface thereof, but also in holding the lens properly for fine grinding and polishing.

Another feature of the invention consists in providing on the lower portion of the face of said lens block a recess or beveled portion with an arched line of division between the upper portion of the face of the lens block to adapt the lens block for the accurate mounting of the bifocal lens, the lower segment of said bifocal lens being adapted to be mounted over the recess or beveled portion of the lens block and so that the division line between the major and minor fields of the bifocal lens will register with the arched division line of the face of the block. This greatly facilitates the accurate blocking of bifocal lenses, and will prevent scratching of the central and major surface of the lens.

The full nature of the invention will be understood from the accompanying drawings and the following description and claims:

In the drawings, Figure 1 is a plan view of a lens block illustrating this invention. Fig. 2 is a central section through the lens block and lens secured thereon on the horizontal meridian line in Fig. 1. Fig. 3 is a side elevation of a grinder and lens holding means operable therewith, parts being omitted and parts broken away. Fig. 4 is a plan view of a lens block with a collet associated therewith having indicating marks thereon and a lens indicated by a dotted line. Fig. 5 is a vertical section through the center of Fig. 4. Fig. 6 is a central vertical section through a bifocal lens blank. Fig. 7 is a plan view of a modified form of block for mounting the convex or plus sides of lenses. Fig. 8 is a central vertical section through Fig. 7.

A lens block 10 is made for receiving and blocking a lens blank such as 11, or any other substantially circular lens; which has been finished or generated on one side. The lens block is circular and has a centrally threaded recess 110 to receive the threaded end of a rod 111 which extends through a lens holder 17 mounted on a fulcrum 18, shown by dotted lines in Fig. 3, that is fulcrumed in the frame 118 so that it may be oscillated on the fulcrum, as indicated in Fig. 3 by dotted lines, and bring the lens in position to be ground or otherwise treated by a rotary grinder 16 on a shaft 116, or any other rotary means for treating the lens. The lens block has an annular beveled surface 14 at its edge, as shown in Fig. 1. This is adapted for seating the finished concave surface of the lens 11 directly thereon, that is, in direct physical contact with the outer portion of the said lens blank surface, as shown in Fig. 2. Also this beveled seat 14 is adapted to hold a lens of the type shown in Fig. 2, out of contact with the central portion of the block. The face of the block may be flat or curved with a slightly less curvature than the adjacent side of the lens that is to be blocked thereon, so as to leave a space between the block and lens, as shown in Fig. 2. The lens is held on the block by cement 15 uniting the center of the lens with the center of the block, and the outer portion of the lens resting on the annular surface 14, as seen in Fig. 2. This is a very desirable mode of mounting lenses accurately, especially lenses of fine quality.

The lens block has notches 210 in its periphery to enable the lens to be removable from the block when the lens is substantially the same diameter as the block. This becomes of little importance when the lens is of greater diameter than the block, as shown in Fig. 2, but the lens need be greater than the diameter of the block only when it is desired to edge the lens without removing it from the block, and this is not the usual method of making lenses, but it is a desirable method. In making many kinds of lenses it is desirable that the lens be blocked properly after its surfaces have been generated, for fine grinding and for polishing. In that case the principal meridians and the optical center of the lens is marked by a protractor or otherwise and then the lens is blocked on the lens block so that the markings on the lens will correspond to those on the block. To that end the block, as shown in Fig. 1, is provided with notches 12 with a vertical line 13 therefrom to indicate the vertical meridian or meridional line and a horizontal line 13 to indicate the horizontal or equatorial meridian. These are usually termed the principal meridians or axes of the lens. The horizontal line 13 is not necessarily truly horizontal as some prescriptions require variations from the truly horizontal position of such lens.

For mounting or blocking bifocal lenses, especially one piece lenses, the lower part of the block is recessed or cut away at 30 in order to receive and accommodate the lower or reading segment or field 31, as shown in Fig. 6. The reading field of such lens is thinner than the major field 32. Furthermore, the division line 33 is arched substantially as appears in Figs. 1 and 4. This block, as shown in Fig. 1, is adapted to receive and provide accurate mounting for such bifocal lens and it is important that the proper relation called for by the prescription between the reading segment and the principal meridian shall be maintained and shall have corresponding indications on the lens block, and to that end the lens block, shown in Fig. 1, has an arched division line 34 which should correspond with the division line of bifocal lenses adapted to be blocked on said lens block. Hence, there must be a variety of said lens blocks adapted for different classes of lenses.

If desired, instead of cementing the lens block, as indicated in Fig. 1, a collet 25, as shown in Fig. 4, will be associated therewith and surrounding the same and have indicating marks 112 thereon for aiding in centering the lens, these marks 112 being continuous of the meridional lines 13 shown in Fig. 1. This collet when in place extends beyond the margin of lens 11, as shown by a dotted line in Fig. 4, and the collet is used more particularly for blocking lenses wider than the lens block shown in Fig. 1, and particularly where it is desired to edge the lens without removing it from the lens block, on which it may have been fine ground or polished.

The invention claimed is:

1. A circular lens block having its surface beveled near its margin for seating a lens in direct physical contact with the surface of the lens block at substantially equal distances from the center of the lens and for supporting the middle portion of the lens slightly spaced from the middle portion of the block and with one edge portion thereof formed to adapt said portion of the block to receive the reading field of a bifocal lens, whereby the middle portion of the lens may be secured by cement or the like to the middle portion of the block.

2. A circular lens block having its surface beveled near its margin for seating a lens in direct physical contact with the surface of the lens block at substantially equal distances from the center of the lens and for supporting the middle portion of the lens slightly spaced from the middle portion of the block and with one edge portion thereof recessed to adapt the block for blocking a bifocal lens, said recessed portion having an arch-shaped dividing line between it and the remaining portion of the block and adapted to receive the reading field of a lens.

In witness whereof, I have hereunto affixed my signature.

LUCIAN W. BUGBEE, Jr.